United States Patent [19]

Koehler et al.

[11] Patent Number: 4,710,071

[45] Date of Patent: Dec. 1, 1987

[54] FAMILY OF ELECTRIC DRILLS AND TWO-SPEED GEAR BOX THEREFOR

[75] Inventors: Heinrich P. Koehler, Hanover, Pa.; John R. Dixon, Hampstead, Md.

[73] Assignee: Black & Decker Inc., Newark, Del.

[21] Appl. No.: 863,968

[22] Filed: May 16, 1986

[51] Int. Cl.$^4$ .......................... B23B 47/14; F16H 3/32
[52] U.S. Cl. ...................................... 408/133; 74/371; 74/375; 408/20; 408/241 R
[58] Field of Search .................. 408/124, 20, 132, 133, 408/241 R; 74/342, 343, 368, 369, 370, 371, 372, 373, 375, 421 A

[56] References Cited

U.S. PATENT DOCUMENTS

| | | | |
|---|---|---|---|
| 1,965,669 | 7/1934 | Robb | 74/421 A X |
| 2,911,841 | 11/1959 | Miller | 74/342 |
| 2,942,490 | 6/1960 | Riley, Jr. et al. | 74/370 |
| 3,178,956 | 4/1965 | Stanley | 74/375 |
| 3,396,593 | 8/1968 | Moores, Jr. | 74/371 |
| 3,500,696 | 3/1970 | Berube | 74/342 X |
| 3,808,904 | 5/1974 | Gotsch et al. | 74/371 X |
| 4,493,223 | 1/1985 | Kishi et al. | 74/371 |

FOREIGN PATENT DOCUMENTS 0145070 6/1985 European Pat. Off. .
2511469 6/1985 Fed. Rep. of Germany .

Primary Examiner—Gil Weidenfeld
Assistant Examiner—Glenn L. Webb
Attorney, Agent, or Firm—Edward D. Murphy; Harold Weinstein; Edward D. C. Bartlett

[57] ABSTRACT

A two-speed gear box for handheld electric drills and the like has the movable parts associated with gear changing on or associated with a lay shaft. Gear changing is preferably effected by moving a pair of dogs, slidably mounted in holes through a lay shaft gear, to drivingly engage in either of two dog clutch members on the lay shaft. A thin flexible arm, preferably including a ring around the lay shaft, mounted in cantilever fashion from a movable base effects movement of the dogs. Should the dogs not be in proper register with a respective dog clutch member when changing speed, then the arm flexes and urges the dogs into driving engagement when proper register occurs. A family of two-speed drills having different specialized functions, e.g. a drill, a hammer drill, a screwdriver/drill, a screwdriver, etc., can be produced with the maximum parts in common enabling greater manufacturing flexibility and lower cost of manufacturing the family. Essentially the only parts different for different members of the family need be the gear box output shaft and the specialized function parts associated directly therewith. Advantageously, a family of battery operated tools can be provided in this way.

18 Claims, 14 Drawing Figures

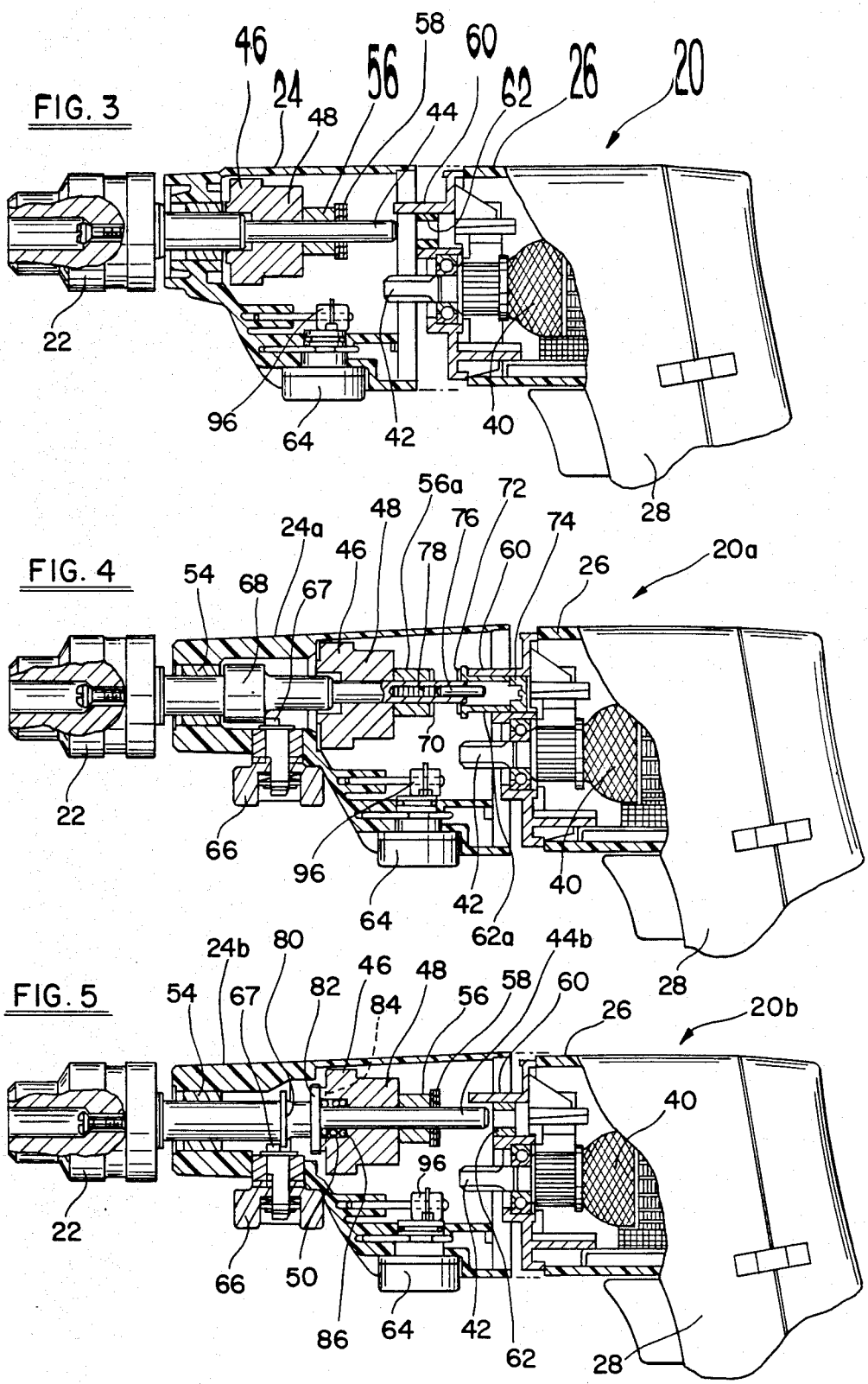

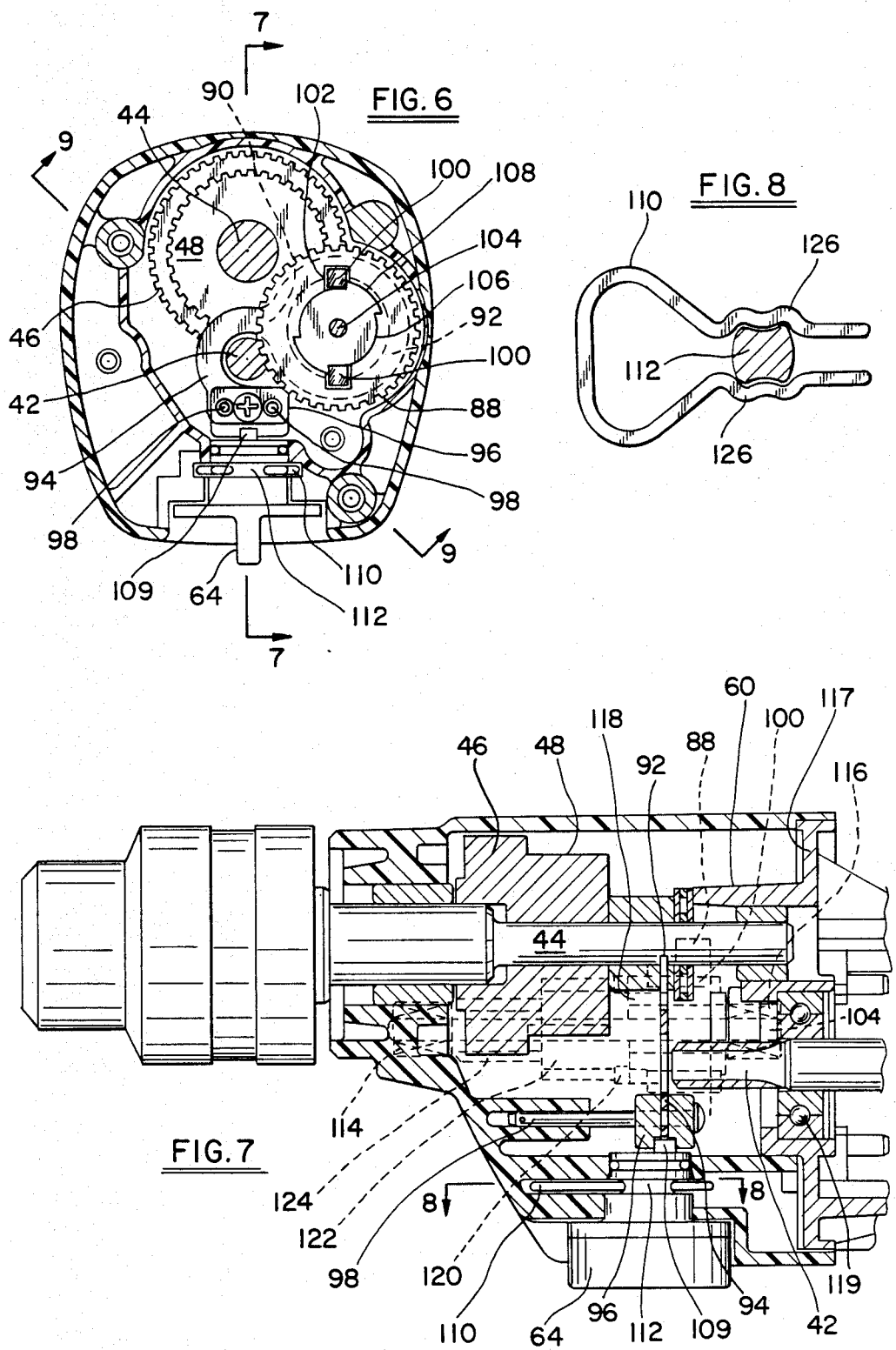

FAMILY OF ELECTRIC DRILLS AND TWO-SPEED GEAR BOX THEREFOR

FIELD OF THE INVENTION

This invention relates to a family of multi-speed portable electric tools having different specialized functions, and also to a multi-speed gear box therefor. The invention particularly relates to a family of two-speed handheld electric drills.

BACKGROUND OF THE INVENTION

Different portable electric drills having different specialized functions, such as drilling, hammer drilling, screwdriving etc., are well known. However, due to the different mechanisms needed to perform these different specialized functions, each of these different portable electric tools is usually individually designed and requires a separate production arrangement to manufacture.

Some of these specialized tools may be provided with a two-speed gear box to improve their performance when operating upon different materials or when performing different tasks. However, the incorporation of known two-speed gear boxes further complicates the manufacture of these tools and has tended to increase the differences in construction, and therefore manufacture, between such tools designed to perform specialized functions which are different from tool to tool.

Further, some of the two-speed gear transmission arrangements that have been used involve rather complicated or individual assembly procedures, and/or have deficiencies concerning gear changing, particular when the tool is running. As a consequence, there has been a tendency to specifically design different two-speed gear boxes for incorporation in different specialized tools.

SUMMARY OF THE INVENTION

The present invention is concerned with providing an improved two-speed gear transmission having an improved gear shifting arrangement.

The present invention is also concerned with providing a two-speed gear transmission which can readily be incorporated in different specialized drills during manufacture.

The present invention is also concerned with providing a family of multi-speed portable electric tools which have the maximum number of parts in common, and only require changes to a few parts to manufacture any member of the family.

Accordingly, therefore, there is provided by one aspect of the present invention a handheld electric tool having an electric motor arranged to drive a tool holder through a gear transmission having different transmission ratios with a gear shift element having a manual actuating member, the actuating member being movable between two positions for changing the gear transmission between high and low transmission ratios. The gear transmission includes an output shaft for driving the tool holder and two output gears mounted on the output shaft for rotation of the latter, and also includes a lay shaft having two lay shaft gears mounted thereon and in mesh respectively with the two output gears. Two dog clutch members are mounted on the lay shaft together with a dog carrier member having a dog slidably mounted therein, this dog being disposed radially outwardly of and being slidable parallel to the lay shaft. The gear shift element has an arm extending transversely to the lay shaft and engaging the dog for moving the latter between low and high transmission ratio positions, in the low transmission ratio position the dog engaging in one of said dog clutch members to effect drive from the motor to one of the lay shaft gears, and in the high transmission ratio position the dog engaging in the other of the dog clutch members to effect drive from the motor to the other of the lay shaft gears. The gear shift arm is flexible, but only flexes after actuation of the manual actuating member if the dog does not immediately engage in the respective dog clutch member, this flexing then urging the dog to complete such engagement.

The gear shift arm is preferably made from thin steel sheet and is preferably relatively stiff, so normally maintaining an unflex disposition—even during gear ration shifting. The flexibleness of this arm enables the manual actuating member to complete its gear shifting movement even if the dog does not immediately engage the respective dog clutch member. The relative stiffness of the flexible arm then urges driving engagement when the dog and the dog clutch member come into correct register. This facilitates both quick and easy gear changing, and also enables changing on the fly.

Preferably, a pair of dogs are slidably mounted in holes through a third lay shaft gear which is directly driven by the motor. The gear shift arm may have a ring portion which encircles the lay shaft and engages through slots in the dogs. One of the dog clutch members may be secured to the lay shaft for rotation therewith, and the other dog clutch member may be secured to a lay shaft gear which is freely rotatable on the lay shaft. The two output gears are preferably integrally formed as a single compound gear.

According to another aspect of the present invention, there is provided a family of handheld electric tools, members of the family being adapted to perform different functions, wherein each member of the family has the following items and structures identically in common; a motor compartment, an electric motor mounted in the motor compartment and having a forwardly extending armature shaft with a pinion at a forward end, a handle depending from the motor compartment and having means for supplying electric power to the motor, a mounting plate at a forward end of the motor compartment, a forward bearing of the armature shaft being mounted in this mounting plate and the armature shaft extending forwardly through this mounting plate, a two-speed gear train disposed forwardly of the mounting plate and having a lay shaft journalled in a bearing in the mounting plate which also has a bearing support for an output shaft, a plurality of lay shaft gears on the lay shaft, one of these gears meshing with the motor pinion, a plurality of output gears meshing with at least some of the lay shaft gears, and means for changing the gear ratio of the gear train between low and high speed ratios, this changing means including a manually operable member and means for selectively placing different gears on the lay shaft in driving relationship between the lay shaft gear meshing with the motor pinion and the output gears.

Different family members may have differently formed output shafts upon which the output gears are mounted, a rear end of each output shaft being journalled in a bearing mounted in the bearing support. These output shafts together with other parts directly associated therewith determine different functions performable by different members of the family.

Thus, the only parts that need change when manufacturing any member of the family can be limited to the output shaft and specialized functional parts directly associated therewith. This aspect of the invention is particularly advantageous when producing a series of battery operated tools, each using a similar rechargeable battery pack.

By having the movable gear changing parts all associated with the lay shaft, it will be appreciated that, with only a possible change of the output shaft, the same gear cluster, lay shaft, and other operating components of the two-speed gear box can readily be incorporated in different tools having different specialized functions. The adaptation of different output shafts for different tools is further facilitated when the two output gears are integrally formed.

A family of two-speed tools can be manufactured in accordance with the invention using essentially the same production line with fewer different parts requiring inventoring and greater flexibility in changing from manufacturing one member of the family to another. This further results in a cost saving in the manufacturing.

Other objects, features and advantages of the various aspects of the present invention will become more fully apparent from the following detailed description of the preferred embodiments, the appended claims and the accompanying drawings.

BRIEF DESCRIPTION OF THE DRAWINGS

In the accompanying drawings:

FIG. 3 is a view similar to the upper portion of FIG. 2 but with the gear box compartment separated a short distance from the motor compartment and the handle portion of the drill;

FIG. 4 is a view similar to FIG. 3 but illustrating a hammer drill according to the present invention;

FIG. 5 is a view similar to FIG. 3, but showing a screwdriver/drill according to the invention;

FIG. 6 is a section approximately on the staggered line 6—6 of FIG. 2 through the gear box compartment;

FIG. 7 is a section approximately on the line 7—7 of FIG. 6 with the lay shaft and gears associated therewith shown in broken lines;

FIG. 8 is a view on the line 8—8 of FIG. 7 of a spring clip engaging detents in a gear shift control;

DETAILED DESCRIPTION OF THE PREFERRED EMBODIMENTS

FIGS. 3 to 5 illustrate three different hand-held electric drills of a family of tools according to the present invention, each being constructed to perform different specialized functions, and all these tools having the same two speed gear box and the maximum of parts in common. Essentially, the only differences between the three different tools of FIGS. 3, 4 and 5 are the shape of the chuck drive draft and some of the parts associated therewith; however, the gears of the gear box which are mounted on the chuck drive shaft are the same in each of the tools.

The preferred embodiment of the two speed gear box for use in each of the series of tools of FIGS. 3 to 5 is illustrated more fully in FIGS. 6 to 14.

Figure 1:
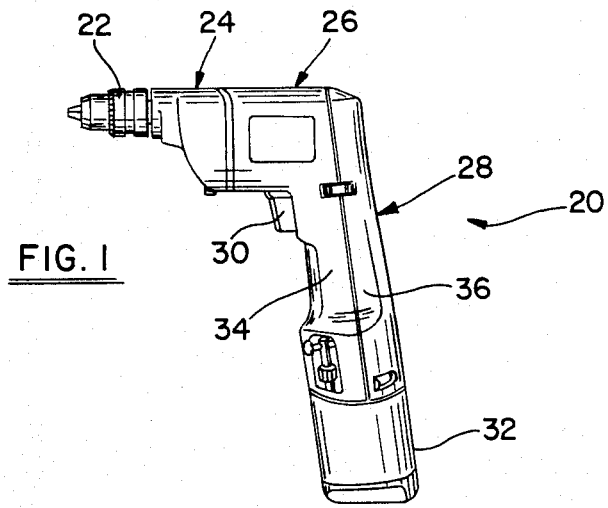
FIG. 1 is a perspective view of a two-speed, battery-powered portable drill according to the invention.

FIG. 1 shows in perspective view a two speed drill according to the invention. The drill has a chuck 22, a gear box compartment 24, a motor compartment 26, a handle 28, a trigger switch 30, and a battery pack housing 32.

Figure 2:
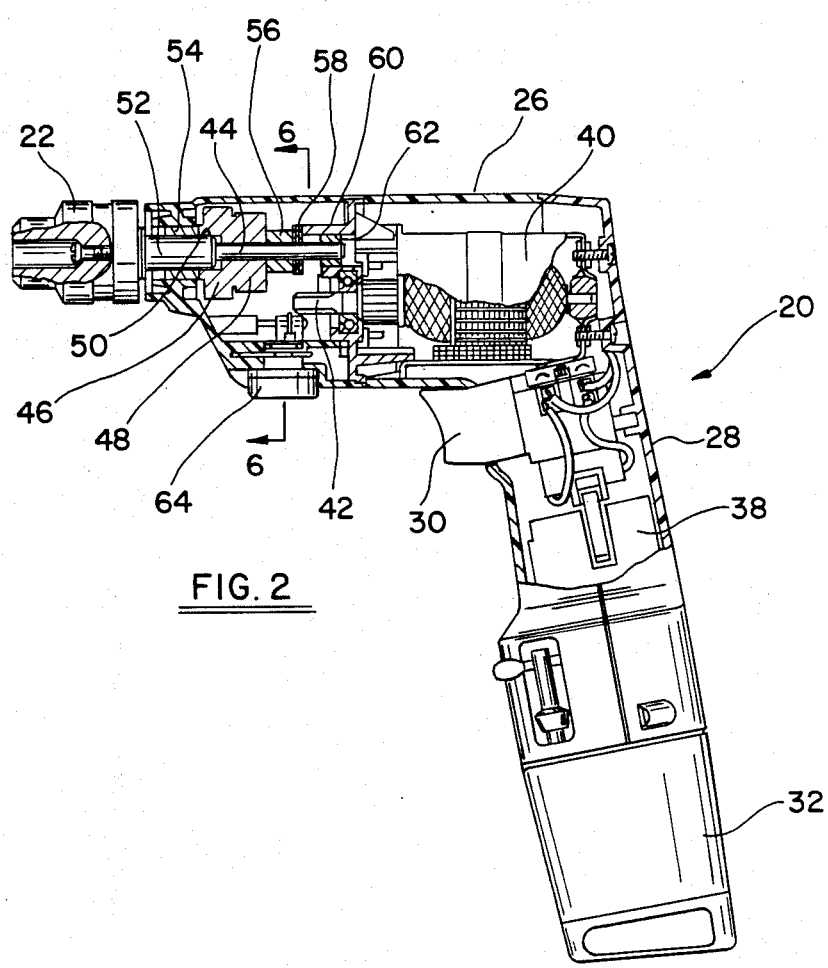
FIG. 2 is an elevational side view of the drill of FIG. 1 with some parts broken away, some parts sectioned, and some parts omitted including a lay shaft and the gears associated therewith in a front gear box compartment of the drill.

FIG. 2 shows some of the internal parts of the drill of FIG. 1. A rechargeable battery pack 38 extends upwardly inside the handle 28 from the battery pack housing 32, and is electrically connected to the main body of the trigger switch 30. The trigger switch 30 controls the power supplied from the battery pack 38 to the universal electric motor 40. The forward end of the armature shaft of the motor 40 is formed as a pinion 42 which extends into the gear box compartment 24. The chuck drive, or output, shaft 44 of the drill has a low speed gear 46 and a high speed gear 48 secured thereon. Preferably, the gears 46 and 48 are integrally formed as a compound gear which is press-fitted onto the shaft 44. The forward end of this compound gear 46, 48 has a counter bore 50 in which engages a forward enlarged portion 52 of the shaft 44. The enlarged portion 52 is journalled in a forward bearing 54 mounted in the gear box compartment 24. The rear end of the composte gear 46, 44 abuts a spacer 56 which bears against a thrust bearing 58. The thrust bearing 58 is axially supported against rearward movement by a bearing support 60 integrally formed on a mounting plate separating the gear box compartment from the motor compartment 26, the support 60 extending forwardly into the gear box compartment 24. The rear end of the output shaft 44 is journalled in a bearing 62 mounted in the bearing support 60. A gear change control knob 64 is rotatable through 180 degrees to change from low speed to high speed and vice versa. The lay shaft of the gear box and the gear train from the motor pinion 42 to the compound gear 46, 48 have been omitted for simplicity, but will be described later.

FIGS. 3, 4 and 5 show similar views of members of a series of hand-held electric tools to which the present invention has been applied. FIG. 3 shows the two speed drill 20 of FIGS. 1 and 2 and is a similar view to the upper part of FIG. 2. FIG. 4 shows a two speed hammer drill 20a, and FIG. 5 shows a two speed screwdriver/drill 20b. In each of FIGS. 3 to 5, the gear box housing 24, 24a, and 24b, respectively, is shown detached from the motor compartment 26. In each of these portable drills 20, 20a, and 20b, the portion on the right hand side i.e. the motor compartment 26, the handle portion 28, the battery pack housing 32 (see FIGS. 1 and 2), and all the interior parts thereof, are identical. In each of these drills 20, 20a, 20b, the same bearing support 60 and motor shaft pinion 42 extend forwardly and when the tool is assembled extend into the respective gear compartment 24, 24a, 24b. Thus, the three different tools 20, 20a, 20b can be simply manufactured by assembling the same motor compartment and handle unit 26, 28 to different gear compartments 24, 24a, 24b. Further, each of these gear compartments 24, 24a, 24b have a number of identical parts in common which are indicated by the same reference numerals in FIGS. 3, 4 and 5. In particular, the compound gear 46, 48 on the chuck drive shaft is the same, the gear change knob 64 and the parts associated therewith are the same, and—although omitted for clarity in FIGS. 3, 4 and 5—the lay shaft and the gears and parts mounted thereon are the same. The gears on the lay shaft transmit the drive from the motor pinion 42 to either of the gears 46, 48 as will be described more fully later.

The differences between the gear box compartments 24a and 24b of FIGS. 4 and 5 and the gear box compartment 24 of FIG. 3 will now be described.

In FIG. 4, the nose portion of the compartment 24a is provided with a second control knob 66 for mode changing between a "drill only" mode, as shown, and a "hammer and drill" mode. The chuck drive shaft 44a is provided adjacent its forward end with an enlargement 68 with which an eccentric 67 of the control knob 66 cooperates to hold the shaft 44a to the left, i.e. in a forward position, to keep two sets of ratchet teeth 70, 72 from engaging. The spacer 56a, adjuxtaposed the rear-side of the gear 48, is a press fit on the shaft 44a and has the set of ratchet teeth 70 formed around its rear end. The bearing 62a is modified to have a forward flange which non-rotatably engages the bearing support 60, with the set of stationary ratchet teeth 72 formed on the forward face of this flange. A cap 74, press-fitted in the bearing support 60, is engaged by a pin 76 slidably engaged in a counterbore in the rear end of the shaft 44a. A coil spring 78 is compressed in this counterbore between the shaft 44a and the pin 76 to normally resiliently urge the shaft 44a to a forward position as shown, but allowing in the hammer mode (when the mode change knob is rotated through 180 degrees) the rotating ratchet teeth 70 to engage the stationary ratchet teeth 72 upon the drill being pressed against a workpiece to produce a hammering action.

In FIG. 5, the screwdriver/drill 20b is provided with the same mode change control knob 66 as that in FIG. 4. However, the eccentric 67 cooperates with a shoulder 80 on the chuck drive shaft 44b to limit forward movement of the shaft 44b under the action of a coil spring 86 in the counterbore 50 of the compound gear 46, 48. The shaft 44b is also provided with a transverse pin 82 which, when the drill 20b is pushed against a workpiece so moving the shaft 44b rearwardly, engages in notches 84 in a forward boss on the gear 46. The compound gear 46, 48 is a sliding fit on the shaft 44b. Consequently, in the "screwdriver mode" the force by which the drill 20b is pressed against the workpiece will determine the torque transmittable by the compound gear 46, 48 before the pin 82 rides out of the notches 84. When the mode change knob 66 is rotated through 180 degrees, the flange 80 is forced to the right so that the pin 84 is non-movably engaged in a pair of notches 84 to provide a "drill only" mode of the screwdriver/drill 20b. For interchangeability of parts during manufacture of the different drills 20, 20a, 20b, the compound gear 46, 48 in drills 20 and 20a is also formed with the notches 84.

It will be appreciated, that essentially the only differences between the family of drills 20, 20a, and 20b concerns the machining of the chuck drive shaft 44, 44a, or 44b, and some of the components directly associated therewith; the remainder of the components are identical in these three tools, these identical components comprising the major portion of each tool.

The two speed gear box, including the lay shaft and gear change mechanism thereof, which is preferably used in the whole series of tools 20, 20a, 20b, will now be described in greater detail with references to FIGS. 6 through 14.

FIG. 6 is a section on the slightly staggered line 6—6 in FIG. 2 looking forwardly into the gear box compartment. The motor pinion 42 drivingly meshes with a gear wheel 88 located to one side of the pinion 42 and the chuck drive shaft 44. A flexible gear shift arm 90 of thin spring steel sheet has a ring portion 92 adjacent to and concentric with the gear 88. The ring 92 is connected by an integral curved leg portion 94 to a plastic base 96. The leg portion 94 is curved around the location of the pinion 42 to give clearance between these parts should this be necessary. The base 96 is slidably mounted on a pair of parallel guide rods 98 which are secured to the housing of the gear box compartment. An eccentric 109, extending upwardly from the gear change control knob 64, engages in a cavity in the base 96 for moving the base 96 along the guide rods 98 when the control knob 64 is rotated. A pair of dogs or keys 100 of rectangular cross section are slidably mounted in correspondingly shaped holes 102 axially through the gear 88. The ring 92 loosely engages through slots in the dogs 100 to move the dogs axially when the control knob 64 is rotated. The gear 88 is freely rotatable on the lay shaft 104. A segmented dog clutch member 106 is a press-fit on the lay shaft 104 for rotation therewith. The dog clutch member 106 has a pair of diametrically opposed segments 108 which are drivingly engaged by the pair of dogs 100 when the latter are slid to a rearward position. A spring clip 110 resiliently engages a neck portion 112 of the control knob 64 to provide detent means for releasably retaining the control knob 64 (and therefore the ring 92) in either of two operating positions, one for low speed and the other for high speed.

FIG. 7 illustrates a section generally on the line 7—7 of FIG. 6. One of the guide rods 98, upon which the base 96 slides, can be seen secured in a boss on a forward wall of the gear box compartment. The lay shaft 104 is journalled at each end in bearings 114 and 116. The rear bearing 116 is mounted in the mounting plate 117 which provides the bearing support 60 and also a mounting for a forward bearing 119 of the armature shaft. The gear 88, which meshes with the pinion 42 on the end of the armature shaft, has an integral forward boss 118 provided with keyways in which the dogs 100 are axially slidable. A second dog clutch member 120, similarly shaped to the dog clutch member 106, is rigidly secured to a rear face of a lay shaft gear 122. Both the gear 122 and the member 120 are freely rotatably on the lay shaft 104. A smaller diameter gear 124 is secured to the lay shaft 124 by press-fitting, and is located just forwardly of the gear 122. The lay shaft gears 122 and 124 are constantly in meshing engagement with the output drive gears 48 and 46, respectively.

FIG. 8 is a partial section on the line 8—8 in FIG. 7 and shows in plan view the spring clip 110 having W-like curved portions 126 intermediate leg portions of the clip 110. The center, inwardly directed, peaks of the W-like portions 126 are adapted to engage in diametrically opposed detent notches in the neck 112 of the speed control knob 64. The spring clip 110 and the detent notches in the neck 112 retain the control knob 64 in either of two rotational positions 180 degrees apart.

Figure 9:
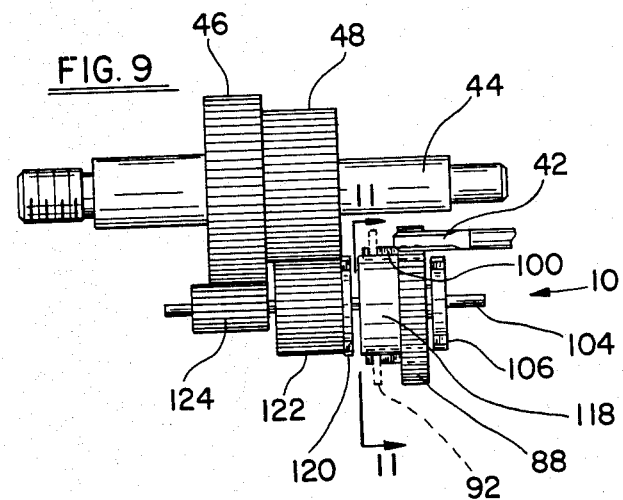
FIG. 9 is a view on the line 9—9 of FIG. 6 of the chuck drive shaft and the lay shaft and the gears associated with both.

FIG. 9 is a diagrammatic view on the line 9—9 in FIG. 6 of the complete gear cluster of the gear box. As can be seen, all the gears remain in mesh in pairs, the motor pinion 42 with the gear 88, the lay shaft gear 122 with the output gear 48, and the smaller lay shaft gear 124 with the larger ouput gear 46. The ring 92 (shown in broken lines) of the gear shift arm is shown in a neutral, intermediate position which is obtained when the gear shift control knob 64 is rotated through 90 degrees from the position shown in FIG. 7. In this intermediate position, the ring 92 positions the pair of dogs 100 so that they do not extend past the axially outer faces of the boss 118 and the gear 88. In this position, the dogs 100 do not engage either of the dog clutch segmented members 106, 120. Also, the integrally formed gear 88 and the boss 118 have a small axial clearance at each end face from the respective adjacent dog clutch member 106, 120. In this neutral position, the motor pinion 42 drivingly rotates the gear 88 which, with the boss 118, freely rotates on the lay shaft 104; no rotational drive is imparted to the lay shaft 104, nor to the lay shaft gears 112, 124, and consequently the chuck drive shaft 44 is not rotated.

Figure 10:
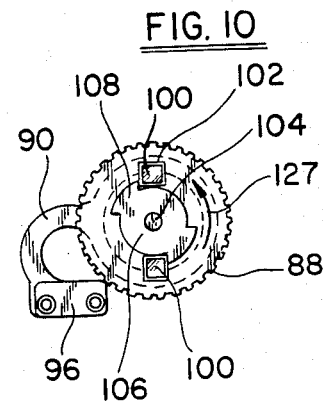
FIG. 10 is a view in the direction of the arrow 10 in FIG. 9 of the lay shaft and showing a gear changing element.

FIG. 10 is an end view of the lay shaft in the direction of the arrow 10 in FIG. 9, but rotated anti-clockwise approximately 30 degrees so that the gear shift arm 90 is in the same position as shown in FIG. 6. The gear 88 is rotated anti-clockwise in the direction of the arrow 127 by the motor pinion. When the gear change ring 92 is moved to the right in FIG. 9 (to the position shown in FIG. 13) the pair of dogs 100 protrude axially from the gear 88 and drivingly engage the segments 108 of the dog clutch member 106 to rotate the lay shaft 104.

Figure 11:
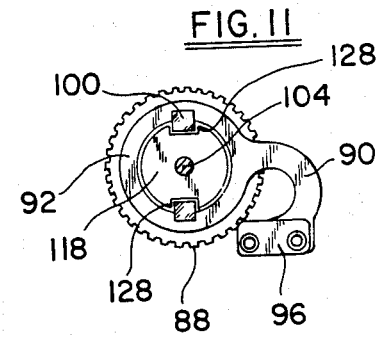
FIG. 11 is a sectional view of the line 11—11 of FIG. 9 and also showing the gear changing element.

FIG. 11 is a section on the line 11—11 of FIG. 9 of the lay shaft, but orientated similarly to FIG. 10. This shows in end view the keyways 128 in the boss 118 in which the dogs 100 engage and are slidable. Also, it clearly shows how the gear shift ring 92 encircles the boss 118 and passes through the dogs 100.

Figure 12:
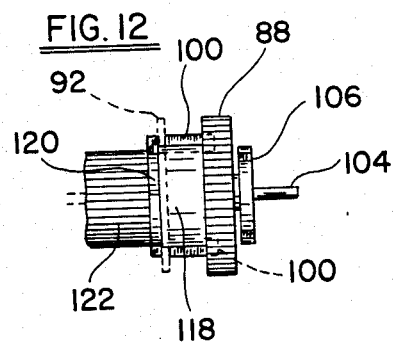
FIG. 12 is a partial view of the lay shaft of FIG. 9 and showing movable parts associated with gear changing in the position for the drill to operate at high speed.

FIG. 12 shows a portion of the lay shaft as shown in FIG. 9, but with the gear shift ring 92 (shown in broken lines) moved to its extreme left hand position (i.e. its forward-most position), this being obtained by rotating the gear shift control knob 64 through 180 degrees from the position shown in FIG. 7. In this position, the gear shift ring 92 slides the dogs 100 forwardly until they engage in the dog clutch member 120. The extending dogs 100 drivingly engage the shoulders of the segments of the member 120 to rotatingly drive the lay shaft gear 122. It should be noted that in this position, the other dog clutch member 106 is not engaged or driven, and the lay shaft 104 is not rotatingly driven by the gear 88. In this position, the lay shaft gear 122 drivingly rotates the gear 48 to rotatingly drive the chuck drive shaft 44 in high speed. In this high speed drive, the gears 46 and 124 idle with the gear 46 rotating the gear 124 and the lay shaft 104 therewith.

Figure 13:
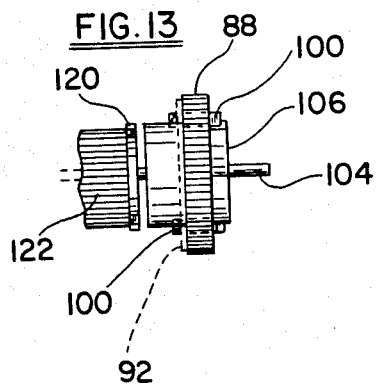
FIG. 13 is a view similar to FIG. 12 but with the movable parts associated with gear changing in the position for the drill to operate at low speed.

FIG. 13 is a similar diagrammatic view to FIG. 12, but showing the position of the gear change ring 92 for low speed drive. By rotating the gear change control knob 64 180 degrees from the position corresponding to FIG. 12, i.e. to the position shown in FIG. 7, the gear change ring 92 is caused to abut against the forward face of the gear 88 so sliding the dogs 100 to the right in FIG. 13. In this position, the right hand ends of the dogs 100 protrude beyond the right hand face of the gear 88 and drivingly engage the shoulders of the segments of the dog clutch member 106. This causes the lay shaft 104 to be drivingly rotated so drivingly rotating the smaller lay shaft gear 124 (see FIG. 9) which in turn drives the larger output gear 46 so driving the output shaft 44 at low speed. In this low speed position, the smaller output gear 48 rotates the lay shaft gear 122 which in turn freely rotates on the lay shaft 104.

Figure 14:
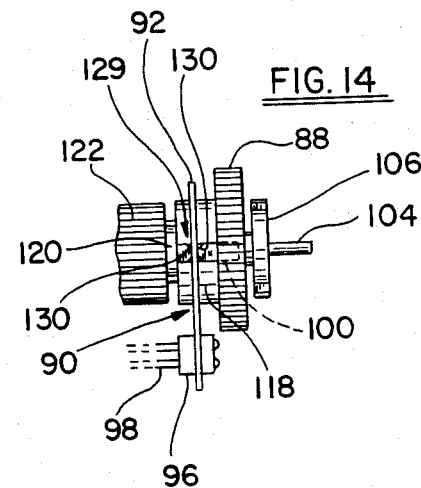
FIG. 14 is a partial view of the lay shaft in the direction of the arrow 14 in FIG. 6, and also showing the gear shifting element and part of its mounting, with the movable gear shifting parts in a neutral position, as in FIG. 9, in which neither low speed nor high speed is engaged and there is no drive from the lay shaft to the chuck drive shaft.

FIG. 14 is a diagrammatic view of part of the lay shaft in the direction of the arrow 14 in FIG. 6. In FIG. 14 the gear change ring 92 is in the same position as illustrated in FIG. 9, i.e. a neutral intermediate position in which the dogs 100 do not extend beyond the outer axial faces of the gear/boss member 88,118. The ring 92 can be clearly seen passing through a slot 129 in the upper dog 100. Also, as shown, all four corners 130 of this slot 129 are chamfered or curved to facilitate angular deflection of the ring 92 due to flexing of the gear shift arm 90.

In operation, to change the speed of drive of the chuck 22 in any of the drills 20, 20a, 20b from low speed to high speed, or vice versa, the gear change control knob 64 is rotated through 180 degrees from the position in FIG. 7 or back to the position in FIG. 7, respectively. The low speed position of the gear shift ring 92 is illustrated in FIG. 13, and the high speed position is illustrated in FIG. 12. It will be noted that when changing between either of these positions, the pair of dogs 100 pass through an intermediate neutral position as illustrated in FIGS. 9 and 14. When the gear change control knob 64 is rotated to either the high speed or the low speed position, it is latched in that position by the detent means comprising the spring clip 110 and the notched neck portion 112. Although the gear shift arm 90 is relatively thin (see FIG. 14) its stiffness will normally retain it in a straight, planar position during speed changing. However, when the desired speed is selected by actuation of the control knob 64 to one of its two latched positions, if the respective axial ends of the dogs 100 engage a side face of the respective dog clutch member 120, 106, instead of entering between the segments thereof, then the gear shift arm 90 will flex. The arm 90 will remain in this flexed configuration until rotation of the boss 118 bring the dogs 100 into register with the spaces between the drive segments of the respective dog clutch member. The inherent stiffness of the gear shift arm 90 will then cause the dogs 100 to further slide axially and fully engage in the spaces between the segments of the respective dog clutch member 106, 120. Further angular rotation of the boss 118 will then bring the extended dogs 100 into driving engagement with the shoulders of the segments of the respective dog clutch member. With this gear shifting arrangement, changes between high and low speed can be effected whether the tool is running or stationary, that is whether electrical supply to the motor 40 has been cut off by release of the trigger 30 or whether the trigger 30 is depressed so energising the motor 40 and causing it to drivingly rotate.

It should be particularly noted that when changing speed, the gear shift arm 90 normally remains straight and unflexed. The arm 90 only flexes if the dogs 100 do not immediately fully engage in the respective dog clutch member 106, 120; but the arm 90 then straightens again as soon as proper driving engagement is attained. It will be appreciated that the gear cluster of the gear box compartment, including the speed change mechanism, is identical for each of the family members of hand-held power drills illustrated in FIGS. 3, 4, and 5. The only difference concerning the gear train is the precise configuration of the chuck drive shaft 44, 44a, 44b. Depending upon which of the tools 20, 20a, 20b is to be assembled at a particular time, the chuck drive shaft is machined to provide the appropriate enlargements, shoulders, counterbores, etc. and to provide the appropriate length and dimensions, for example, to accommodate whether the compound gear 46, 48 is to be a press-fit or a sliding fit on this shaft.

During assembly of any of the family of two speed tools, the gear box compartment 24, 24a, 24b etc. is first fully assembled. With the rear open end of this compartment uppermost, the mounting plate 117 is assembled to this open end to close the gear box compartment. The mounting plate 117 is the same for any of the family of tools, but with the appropriate bearings pressed in place for the gear box shafts. During this assembly of the mounting plate, these bearings engage on the chuck drive shaft and the lay shaft 104. Next the motor assembly is mounted on the mounting plate 117 with the armature shaft pinion entering into the gear box compartment and engaging the gear 88. Also, the forward bearing of the armature shaft engages in its mounting in the mounting plate 117. The motor housing 26 is then engaged over the motor and secured to the gear box compartment. Wiring connections are made between the trigger switch 30 and the motor, and then the rear housing 36 of the handle is attached. Finally, the battery pack and battery pack housing 32 are attached. As will be appreciated, in assembly of the family of tools, assembly from the mounting plate 117 onwards is identical and uses the same parts regardless of the actual family member being assembled. Not only does the present invention provide an improved two speed gear box, but it provides a new approach to the manufacture of a family of portable power drills whereby only a very few parts have to be changed depending upon which particular two speed tool is to be finally assembled at that time. As will be appreciated, this increases the flexibility of manufacturing the family of tools on essentially the same production line, and substantially decreases the number of different components that have to be inventoried to enable continuous production. Not only are most of the components the same, but also most of the sub-assemblies are the same, it only essentially being necessary to change the chuck drive spindle and a few components associated therewith for immediately changing from production of one of the series of two speed tools to any other member of the family.

Although specific examples were given above of a two speed drill 20, and a hammer drill 20a, and a screwdriver/drill 20b, it will be appreciated that further two speed drills can be manufactured in a similar way in accordance with the invention. For example, the family of two speed drills can include a screwdriver/drill with adjustable screwdriver torque, or a two speed screwdriver without "drill only" mode, etc. Further, any of the above family members could also be provided with reversing facility to provide one or more reversing modes.

The above described embodiments, of course, are not to be construed as limiting the breadth of the present invention. Modifications, and other alternative constructions, will be apparent which are within the scope of the invention as defined in the appended claims.

What is claimed is:

1. A handheld electric tool, comprising:
   an electric motor arranged to drive a tool holder through a gear transmission having different transmission ratios;
   a gear shift element having a manual actuating member, said actuating member being movable between two positions for changing said gear transmission between high and low transmission ratios;
   said gear transmission including an output shaft for driving said tool holder, and two output gears mounted on said output shaft for rotation of the latter;
   said gear transmission also including a lay shaft having two lay shaft gears mounted thereon and in mesh respectively with said two output gears;
   two dog clutch members mounted on said lay shaft;
   a dog carrier member mounted on said lay shaft and having a dog slidably mounted therein;
   said dog being disposed radially outwardly of and being slidable parallel to said lay shaft;
   said gear shift element having an arm extending transversely to said lay shaft and engaging said dog for moving the latter between low and high transmission ratio positions, in said low transmission ratio position said dog engaging in one of said dog clutch members to effect drive from said motor to one of said lay shaft gears, and in said high transmission ratio position said dog engaging in the other of said dog clutch members to effect drive from said motor to the other of said lay shaft gears; and
   said arm being flexible but only flexing after actuation of said manual actuating member if said dog does not immediately engage in the respective dog clutch member, said flexing then urging said dog to complete such engagement.

2. The tool of claim 1, wherein said arm comprises a ring which encircles said lay shaft.

3. The tool of claim 2, wherein said ring passes through a slot in said dog, and corners of said slot are bevelled to facilitate deflexion of said ring during flexing of said arm.

4. The tool of claim 2, wherein said gear shift element comprises a base member slidably mounted on a guide rod extending parallel to said lay shaft, said ring is connected to said base member by a leg portion, and said leg portion and ring are made from sheet steel.

5. The tool of claim 4, wherein said base member is slidably mounted on two parallel guide rods, said ring is concentric with and disposed perpendicular to said lay shaft, and said actuating member comprises a rotatable knob having an eccentric engaged in said base member for movement thereof.

6. The tool of claim 1, further comprising a spring clip having leg portions engageable with detent notches in said manual actuating member for releasably latching said actuating member in either of said two positions between which said actuating member is movable.

7. The tool of claim 1, wherein:
one of said lay shaft gears is freely rotatable on said lay shaft;
the other of said lay shaft gears is fixed to said lay shaft for rotation therewith;
said dog carrier member is freely rotatable on said lay shaft and includes a third lay shaft gear in mesh with a pinion on an armature shaft of said motor;
said one dog clutch member being secured to said lay shaft for rotation therewith;
said other dog clutch member being secured to said one of said lay shaft gears for rotation therewith;
said dog engaging said one dog clutch member to rotate said lay shaft and drive said other of said lay shaft gears, said dog engaging said other dog clutch member to drive said one lay shaft gear and allow said lay shaft to be rotated in an idling mode by said other lay shaft gear; and
said dog clutch members being spaced apart along said lay shaft a distance greater than that occupied by said dog so allowing said dog to occupy a non-driving position intermediate movement between said low and high transmission ratio positions.

8. The tool of claim 7, wherein two output gears are integrally formed and are fixed to said output shaft for rotation therewith.

9. A handheld electric tool, comprising:
a housing including a motor compartment and a gear box compartment;
an electric motor in said motor compartment and having a motor drive shaft extending into said gear box compartment;
a two speed gear transmission in said gear box compartment connected to said motor shaft to be driven thereby;
a tool holder connected to said gear transmission to be driven thereby;
said gear transmission comprising a lay shaft carrying first, second, and third lay shaft gears, and an output shaft carrying first and second output gears;
said third lay shaft gear being freely rotatable on said lay shaft and driven by said motor shaft;
said second lay shaft gear being freely rotatable on said lay shaft, and said first lay shaft gear being secured to said lay shaft for rotation therewith;
said first and second output gears being arranged for drivingly rotating said output shaft with said first lay shaft gear meshing with said first output gear and said second lay shaft gear meshing with said second output gear;
a pair of dogs slidably mounted in holes through said third lay shaft gear, said dogs being disposed radially outwardly of said lay shaft;
a first dog clutch member secured to said lay shaft for rotation thereof;
a second dog clutch member secured to said second lay shaft gear for rotation thereof;
a shift arm extending transversely to said lay shaft and having a ring portion encircling said lay shaft and engaging through slots in said dogs;
said shift arm being mounted in said gear box compartment for manual displacement to a limited extent in a direction parallel to said lay shaft between two end positions;
means for releasably latching said shift arm in either of said two end positions;
displacement of said shift arm to one of said end positions moving said dogs to drivingly engage said first dog clutch member to cause driving rotation of said lay shaft and said first lay shaft gear therewith;
displacement of said shift arm to the other of said end positions causing said dogs to disengage from said first dog clutch member and drivingly engage said second dog clutch member to cause driving rotation of said second lay shaft gear; and
said shift arm being flexible and flexing if said dogs are not in register for engagement with and do not drivingly engage the respective dog clutch member when said shift arm is moved to a respective end position, the shift arm when so flexed urging said dogs to move into driving engagement with the respective dog clutch member when said dogs and the respective dog clutch member are in register for engagement.

10. The tool of claim 9, wherein said shift arm extends from a base member which is slidably mounted on two guide rods, said guide rods being spaced apart and extending parallel to said lay shaft.

11. The tool of claim 10, further comprising a control knob rotatably supported by said gear box compartment and having an eccentric engaged in said base member for movement thereof along said guide rods, and wherein said releasably latching means comprises a spring clip engaging said control knob.

12. The tool of claim 11, wherein said spring clip has two legs each with a W-shaped portion intermediate the length thereof, a center part of each said W-shaped portion releasably engaging in a detent recess in a neck portion of said control knob.

13. The tool of claim 9, wherein said shift arm is made from steel sheet, and said first and second output gears are connected together to form a single member.

14. The tool of claim 13, wherein said single member is secured to said output shaft for rotation therewith.

15. The tool of claim 13, wherein said single member is freely rotatable of said output shaft, and single member has notches in one end thereof, and said output shaft carries a transverse pin which is engageable in said notches by relative axial movement of said output shaft through said single member to drivingly couple said single member to said output shaft.

16. The tool of claim 9, further comprising a mounting plate separating said motor and gear box compartments, said motor shaft extending through said mounting plate, a forward bearing of said motor shaft and rear bearings of said output shaft and said lay shaft being mounted in said mounting plate.

17. A family of handheld electric tools, members of the family being adapted to perform different functions, wherein each member of the family has the following items identically in common:
a motor compartment;
an electric motor mounted in said motor compartment and having a forwardly extending armature shaft with a pinion at a forward end;
a handle depending from said motor compartment and having means for supplying electric power to said motor;
a mounting plate closing a forward end of said motor compartment, a forward bearing of said armature shaft being mounted in said mounting plate and said armature shaft extending forwardly through said mounting plate;

a two speed gear train disposed forwardly of said mounting plate and having a lay shaft journalled in a bearing in said mounting plate;

said mounting plate having a bearing support for an output shaft;

a plurality of lay shaft gears on said lay shaft, one of these gears meshing with said pinion;

a plurality of output gears meshing with at least some of said lay shaft gears; and means for changing the gear ratio of said gear train between low and high speed ratios, said changing means including a manually operable member and means for selectively placing different gears on said lay shaft in driving relationship between said lay shaft gear meshing with said pinion and said output gears; and further wherein:

different family members have differently formed output shafts upon which said output gears are mounted, a rear end of each output shaft being journalled in a bearing mounted in said bearing support;

said output shafts together with other parts directly associated therewith determine different functions performable by different members of the family;

outside said gear box compartment all items of each member of the family are identical to the same items of the other members of the family;

said two speed gear train of each family member comprises three lay shaft gears on said lay shaft, and two integrally connected output gears on said output shaft, all these gears being interchangeable between all family members;

each of said family members has interchangeably the following parts in said gear box compartment;

a pair of dogs slidably mounted in holes through one of said lay shaft gears which meshes with said pinion, said dogs being disposed radially outwardly of said lay shaft;

a first dog clutch member secured to said lay shaft for rotation therewith;

a second dog clutch member secured to another of said lay shaft gears for rotation therewith, said second dog clutch member and said another lay shaft gear being freely rotatable relative to said lay shaft; and wherein said gear ratio changing means in each of said family members identically comprises an eccentric on said manually operable member engaged in a base member slidably mounted on a pair of guide rods, a shift arm extending from said guide member transversely to said lay shaft, said shift arm having a ring which encircles said lay shaft and passes through slots in said dogs for shifting the position of said dogs, said shift arm being formed from sheet steel and being flexible; and wherein said means for supplying electric power to said motor comprises identically in each family member a trigger switch mounted in said handle and a rechargeable battery pack housed in said handle.

18. The family of tools of claim 17, wherein members of said family comprise a two speed drill, a two speed hammer drill, and a two speed screwdriver/drill.

* * * * *